US010260702B2

(12) United States Patent
Lee

(10) Patent No.: US 10,260,702 B2
(45) Date of Patent: Apr. 16, 2019

(54) LAMP UNIT AND VEHICLE LAMP DEVICE USING SAME

(71) Applicant: LG Innotek Co., Ltd., Seoul (KR)

(72) Inventor: Jung Ho Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/540,960

(22) PCT Filed: Dec. 29, 2015

(86) PCT No.: PCT/KR2015/014396
§ 371 (c)(1),
(2) Date: Jun. 29, 2017

(87) PCT Pub. No.: WO2016/108570
PCT Pub. Date: Jul. 7, 2016

(65) Prior Publication Data
US 2017/0356628 A1 Dec. 14, 2017

(30) Foreign Application Priority Data

Dec. 29, 2014 (KR) .................. 10-2014-0192397

(51) Int. Cl.
*F21V 17/06* (2006.01)
*F21S 43/00* (2018.01)
(Continued)

(52) U.S. Cl.
CPC .............. *F21S 43/00* (2018.01); *F21S 43/14* (2018.01); *F21S 43/27* (2018.01); *F21S 45/47* (2018.01);
(Continued)

(58) Field of Classification Search
CPC ........ F21V 17/06; F21V 17/164; F21V 5/007; F21S 45/47; F21S 43/00
(Continued)

(56) References Cited

U.S. PATENT DOCUMENTS

| 2007/0230182 A1* | 10/2007 | Tai ........................ F21V 17/06 362/294 |
| 2010/0067240 A1 | 3/2010 | Selverian et al. |
| 2010/0265721 A1* | 10/2010 | Zhou ...................... F21K 9/00 362/311.01 |
| 2010/0302777 A1* | 12/2010 | Knoll ..................... F21V 17/06 362/235 |

(Continued)

FOREIGN PATENT DOCUMENTS

| DE | 20 2007 016 530 U1 | 2/2008 |
| DE | 10 2008 061 688 A1 | 6/2010 |

(Continued)

OTHER PUBLICATIONS

International Search Report in International Application No. PCT/KR2015/014396, filed Dec. 29, 2015.
(Continued)

*Primary Examiner* — Christopher M Raabe
(74) *Attorney, Agent, or Firm* — Saliwanchik, Lloyd & Eisenschenk

(57) ABSTRACT

The present invention provides a lamp unit including an optical member, a base assembly disposed to be spaced a predetermined distance from the optical member with a space therebetween, a light source disposed on the base assembly, and a lens coupled to the base assembly to cover the light source, wherein the lens includes a first protrusion having a first contact surface in contact with one surface of the base assembly and a second contact surface formed at a height different from that of the first contact surface to be in contact with the other surface of the base assembly, and a second protrusion having a third contact surface disposed to be spaced apart from the first protrusion and configured to be in contact with the base assembly, and thus may provide an advantageous effect in that the lens is prevented from being shaken on a substrate as well as being moved on or falling off of the substrate.

20 Claims, 6 Drawing Sheets

(51) Int. Cl.
  *F21S 45/47* (2018.01)
  *F21V 5/04* (2006.01)
  *F21S 43/14* (2018.01)
  *F21S 43/27* (2018.01)
  *G02B 19/00* (2006.01)
  *F21Y 113/17* (2016.01)
  *F21Y 115/10* (2016.01)
  *F21V 3/00* (2015.01)
  *F21V 17/16* (2006.01)

(52) U.S. Cl.
  CPC ............... *F21V 5/04* (2013.01); *F21V 5/048* (2013.01); *F21V 17/06* (2013.01); *G02B 19/0014* (2013.01); *G02B 19/0061* (2013.01); *F21V 3/00* (2013.01); *F21V 17/164* (2013.01); *F21Y 2113/17* (2016.08); *F21Y 2115/10* (2016.08)

(58) Field of Classification Search
  USPC ........................................................ 362/520
  See application file for complete search history.

(56) References Cited

U.S. PATENT DOCUMENTS

| | | | |
|---|---|---|---|
| 2012/0327677 A1 | 12/2012 | Furukawa et al. | |
| 2013/0229810 A1* | 9/2013 | Pelka ..................... | F21V 5/04 362/311.02 |
| 2014/0168997 A1* | 6/2014 | Lee ........................ | F21V 17/164 362/311.06 |
| 2014/0347854 A1 | 11/2014 | Lee et al. | |

FOREIGN PATENT DOCUMENTS

| | | |
|---|---|---|
| EP | 1 860 707 A1 | 11/2007 |
| EP | 2 450 622 A2 | 5/2012 |
| EP | 2 746 645 A2 | 6/2014 |
| WO | WO-01/98708 A1 | 12/2001 |
| WO | WO-03/029722 A1 | 4/2003 |

OTHER PUBLICATIONS

Supplementary European Search Report dated Aug. 16, 2018 in European Application No. 15875664.3.

* cited by examiner

LAMP UNIT AND VEHICLE LAMP DEVICE USING SAME

CROSS-REFERENCE TO RELATED APPLICATIONS

This application is the U.S. national stage application of International Patent Application No. PCT/KR2015/014396, filed Dec. 29, 2015, which claims priority to Korean Application No. 10-2014-0192397, filed Dec. 29, 2014, the disclosures of each of which are incorporated herein by reference in their entirety.

TECHNICAL FIELD

The present invention relates to a lamp unit and a vehicle lamp device using the same, and more particularly, to a lamp unit in which a surface light source is formed and a vehicle lamp device using the same.

BACKGROUND ART

Generally, a lamp is an apparatus configured to generate or adjust light for a specific purpose.

An incandescent bulb, a fluorescent lamp, a neon lamp, or the like may be used as a light source of a lamp, and a light emitting diode (LED) has been recently used as the light source.

LEDs are devices configured to change an electric signal into infrared rays or light using characteristics of a compound semiconductor, and do not use harmful materials such as mercury, and thus have fewer causes of environmental pollution unlike fluorescent lamps.

In addition, a lifetime of an LED is longer than that of an incandescent bulb, a fluorescent lamp, or a neon lamp. In addition, there are advantages in that the LED consumes low power and has excellent visibility due to a high color temperature and less glare when compared to the incandescent bulb, the fluorescent lamp, and the neon lamp.

A lamp unit includes a light source module and a reflector configured to set a directional angle of light emitted from the light source module. Here, the light source module may include at least one LED light source formed on a printed circuit board (PCB).

In addition, the reflector may focus light emitted by an LED light source 1a to emit the light through an opening at a predetermined directional angle and may have a reflective surface at an inner side surface thereof. Such a lamp unit is a lamp configured to focus light emitted from a plurality of LED light sources to generate light, and a lamp in which an LED is used may be used for a backlight, a display device, an illumination lamp, a vehicle display lamp, a head lamp, or the like according to a use thereof.

Particularly, since a lamp unit used in a vehicle is closely related to safe driving of the vehicle, it is very important for a driver of a vehicle adjacent to the driving vehicle to be able to clearly identify a light emitting state thereof.

Accordingly, the lamp unit used in a vehicle has to secure a light quantity sufficient for a safe driving standard and secure an aesthetic function of an exterior of the vehicle.

DISCLOSURE

Technical Problem

The present invention is directed to providing a lamp unit in which a surface light source can be realized with fewer light sources, and a vehicle lamp device using the same.

In addition, the present invention is also directed to providing a lamp unit capable of being applied to a curved mounting object by a plurality of light sources being disposed on a flexible base plate, and a vehicle lamp device using the same.

The scope of the present invention is not limited to the above-described objects, and other unmentioned objects may be clearly understood by those skilled in the art from the following descriptions.

Technical Solution

According to an aspect of the present invention, there is provide a lamp unit including an optical member, a base assembly disposed to be spaced a predetermined distance from the optical member with a space therebetween, a light source disposed on the base assembly, and a lens coupled to the base assembly to cover the light source, wherein the lens includes a first protrusion having a first contact surface in contact with one surface of the base assembly, and a second contact surface formed at a height different from that of the first contact surface to be in contact with the other surface of the base assembly and a second protrusion having a third contact surface disposed to be spaced apart from the first protrusion and configured to be in contact with the base assembly.

The first protrusion may protrude from an edge of a lower surface of the lens toward the base assembly.

The first contact surface may be in contact with an upper surface of the base assembly.

The second contact surface may be in contact with a lower surface of the base assembly.

The first contact surface may be formed as a stepped surface formed on the first protrusion and the second contact surface may be formed as a hooking surface of a hook formed on an end of the first protrusion.

The first contact surface and the second contact surface may face the base assembly.

The second contact surface may protrude from the end of the first protrusion in a radial direction of the lens.

The second protrusion may protrude from an edge of a lower surface of the lens toward the base assembly.

The third contact surface may be in contact with an upper surface of the base assembly.

The third contact surface may be formed as a lower end surface of the second protrusion.

The third contact surface may face the base assembly.

An outermost side of the first protrusion may be continuous with an edge of a lower surface of the lens.

An outermost side of the second protrusion may be continuous with an edge of the lower surface of the lens.

At least two first protrusions identical to the first protrusion may be symmetrically disposed with respect to a center of the lens.

At least two second protrusions identical to the second protrusion may be symmetrically disposed with respect to the center of the lens.

A lower surface of the lens may be disposed to be spaced apart from an upper surface of the base assembly in a height direction thereof.

A lower surface of the lens may be flat surface, and an upper surface of the lens may be a curved surface.

The upper surface of the lens may include a groove corresponding to a center portion of a light emitting surface of the light source.

A hole through which the first protrusion passes may be formed in the base assembly.

The base assembly may include a heat sink and a substrate stacked on the heat sink.

According to another aspect of the present invention, there is provided a vehicle lamp device using the above-described lamp unit.

Advantageous Effects

According to one embodiment of the present invention, since a first protrusion includes a first contact surface and a second contact surface configured to simultaneously grasp upper and lower surfaces of a base assembly, there is an advantageous effect in that a lens is prevented from being moved on or falling off of the substrate.

In addition, according to one embodiment of the present invention, since a second protrusion is formed to be spaced apart from a first protrusion and includes a third contact surface configured to be in contact with a heat sink in a state in which the second protrusion passes through a substrate, there is an advantageous effect in that shaking of a lens on the substrate is prevented in a state in which the first protrusion fixes the lens.

MODES OF THE INVENTION

Hereinafter, an exemplary embodiment of the present invention will be described in detail with reference to the accompanying drawings. Purposes, specific advantages, and novel features of the present invention will be made clear from exemplary embodiments and the following detailed description in connection with the accompanying drawings. Terms and words used in this specification and claims thereof are not to be interpreted as limited to commonly used meanings or meanings in dictionaries, and should be interpreted as having meanings and concepts which are consistent with the technological scope of the present invention based on the principle that the inventors have appropriately defined concepts of terms in order to describe the present invention in the best way. In the description of the present invention, when it is determined that detailed descriptions of related well-known functions unnecessarily obscure the gist of the present invention, the detailed descriptions will be omitted.

It should be understood that, although the terms including ordinal numbers such as second, first, and the like may be used herein in reference to elements of the present invention, such elements are not to be construed as limited by these terms. These terms are only used to distinguish one element from another. For example, a second element could be termed a first element, and a first element could be termed a second element, without departing from the scope of the present invention.

Figure 1:
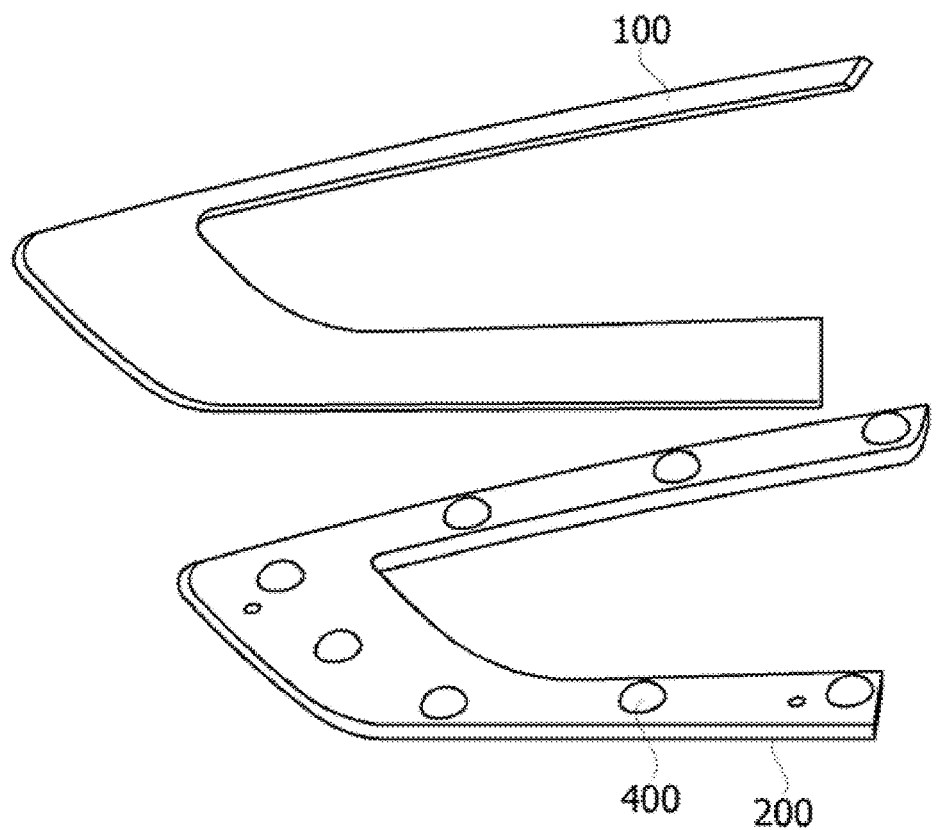
FIG. 1 is a view illustrating a lamp unit according to one exemplary embodiment of the present invention.
Figure 2:
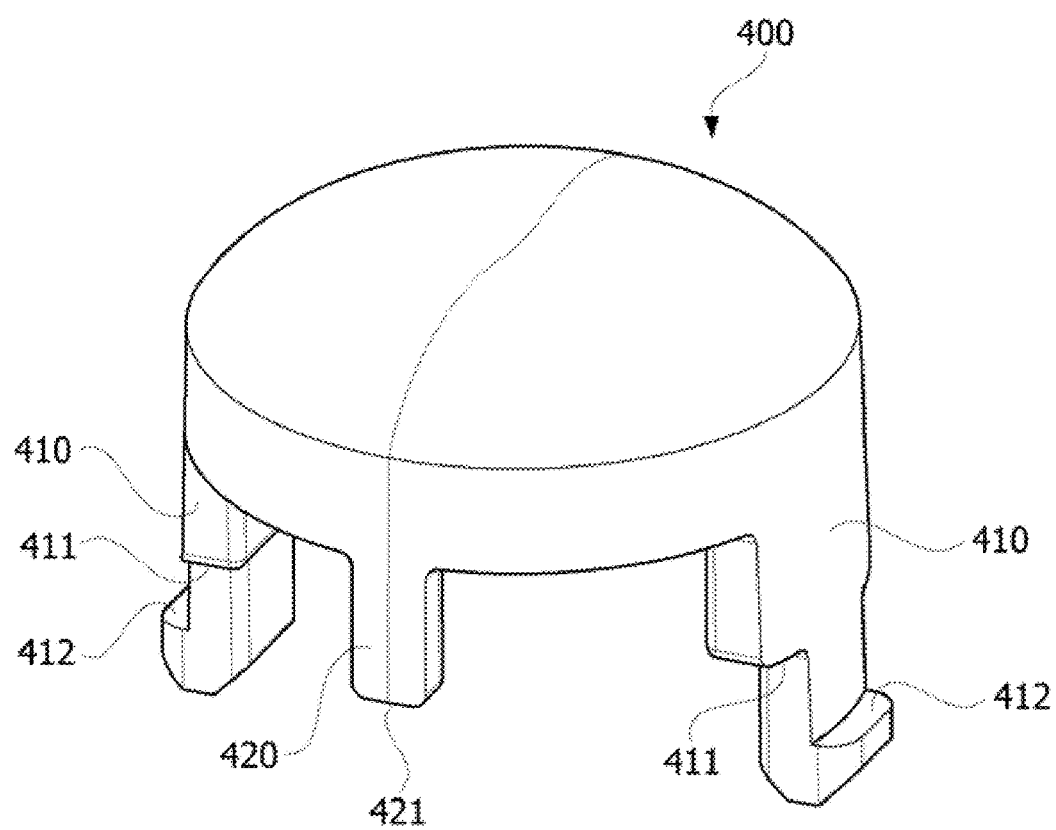
FIGS. 2 and 3 are views illustrating a lens illustrated in FIG. 1.
Figure 3:
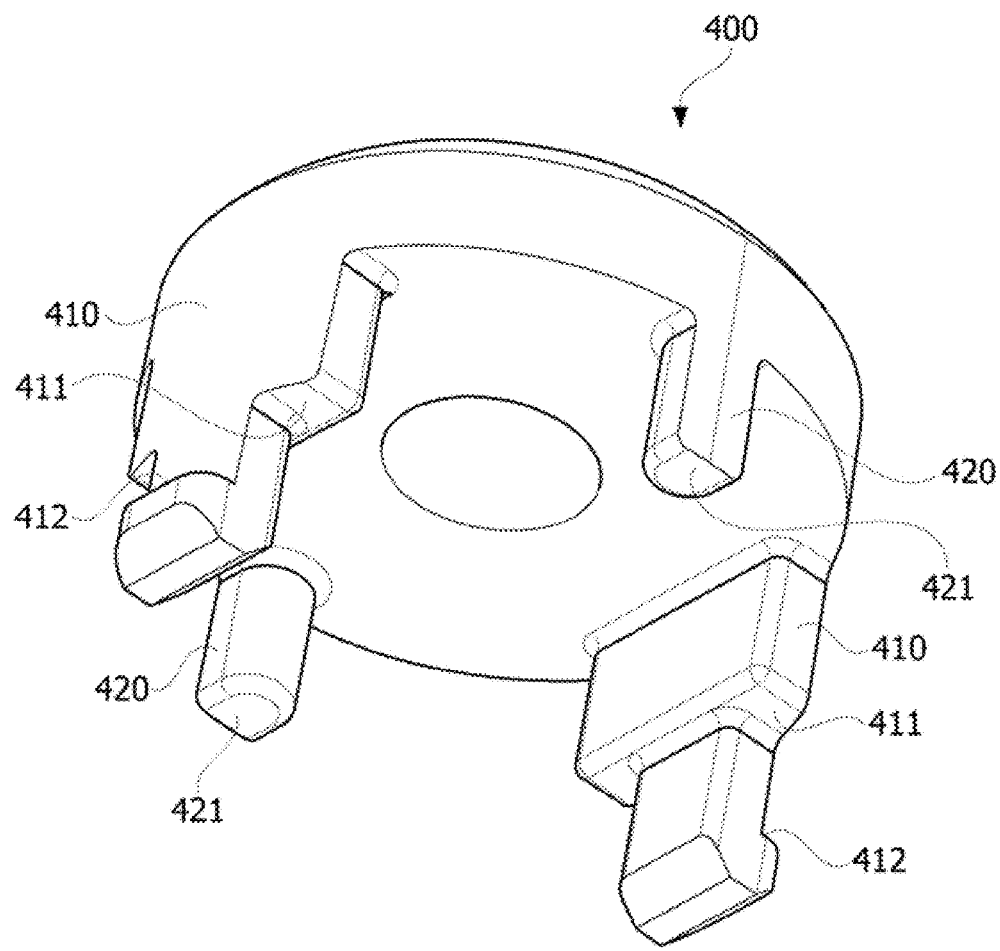
Figure 4:
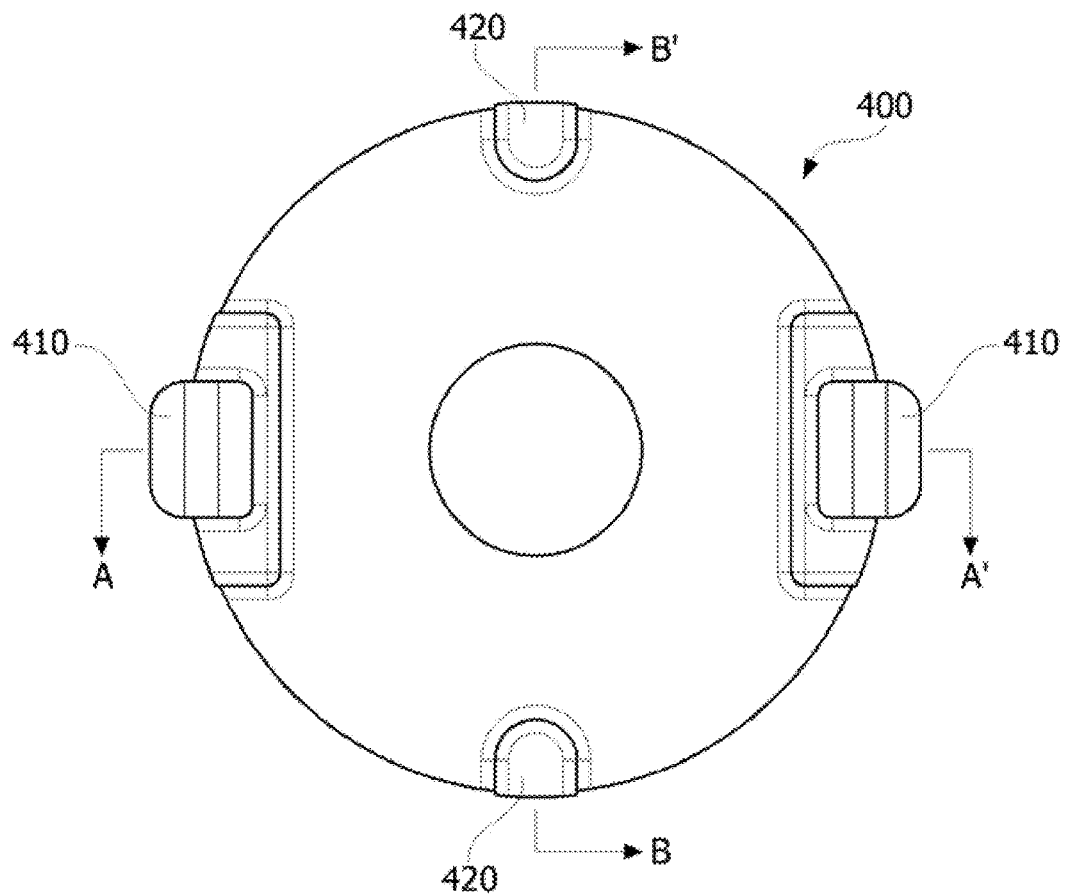
FIG. 4 is a view illustrating a lower surface of a lens.
Figure 5:
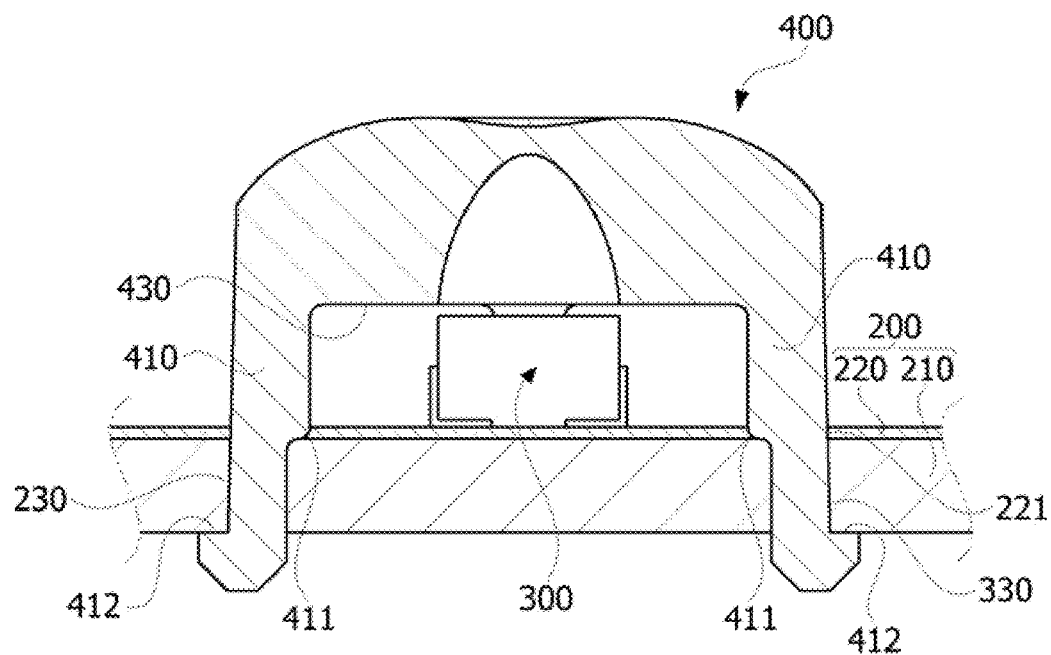
FIG. 5 is a cross-sectional view taken along line A-A' of FIG. 4 and illustrates the lens mounted on a base assembly.
Figure 6:
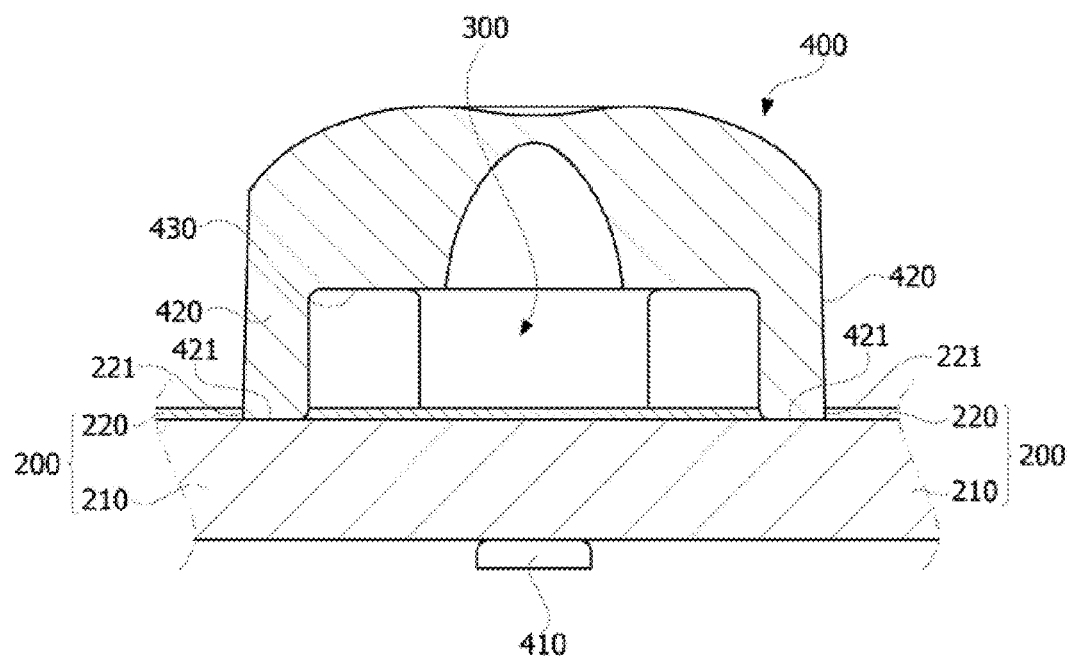
FIG. 6 is a cross-sectional view taken along line B-B' of FIG. 4 and illustrates the lens mounted on the base assembly.

FIG. 1 is a view illustrating a lamp unit according to one exemplary embodiment of the present invention, and FIGS. 2 and 3 are views illustrating a lens illustrated in FIG. 1. In addition, FIG. 4 is a view illustrating a lower surface of a lens, FIG. 5 is a cross-sectional view taken along line A-A' of FIG. 4 and illustrates the lens mounted on a base assembly, and FIG. 6 is a cross-sectional view taken along line B-B' of FIG. 4 and illustrates the lens mounted on the base assembly.

FIGS. 1 to 6 are views clearly illustrating main features for a clear conceptual understanding of the present invention, and thus various modifications are expected and the scope of the present invention is not limited to specific shapes illustrated in the drawings.

Referring to FIGS. 1 to 6, the lamp unit according to one exemplary embodiment of the present invention may include an optical member 100, a base assembly 200, a light source 300, and a lens 400.

First, as illustrated in FIG. 1, the optical member 100 may be disposed to be spaced a predetermined distance from the base assembly 200 with a space therebetween, and a light mixing area may be formed in the space between the base assembly 200 the optical member 100. A surface light source may be formed with fewer light sources through light mixing.

Here, the optical member 100 may be disposed to be spaced about 10 mm or more from the base assembly 200.

When the distance between the optical member 100 and the base assembly 200 is about 10 mm or less, the lamp unit does not have uniform brightness and may have a hot spot phenomenon in which high brightness appears at an area at which the light source 300 is positioned, or a dark spot at which relatively low brightness appears may conversely appear.

In addition, the optical member 100 is formed of at least one sheet and may selectively include a diffusion sheet, a prism sheet, a brightness enhancement sheet, and the like. Here, the diffusion sheet diffuses light emitted by the light source 300, the prism sheet guides the diffused light to a light emitting area, and the brightness enhancement sheet enhances brightness thereof. For example, the diffusion sheet may be generally formed of an acrylic resin, but is not limited thereto. In addition, the diffusion sheet may be formed of a material such as polystyrene (PS), polymethyl methacrylate (PMMA), cyclic olefin copolymer (COC), polyethylene terephthalate (PET), a high permeability plastic such as a resin, or the like capable of performing a light diffusion function. In addition, the optical member 100 may have a concave-convex pattern on an upper surface thereof. This is to increase a diffusion effect thereof.

Meanwhile, the optical member 100 may have a surface having at least one among a concavely curved surface, a convexly curved surface, and a flat surface according to an outer shape of a cover member or a mounting object.

The base assembly 200 may be formed to include a heat sink 210 and a substrate 220 stacked on the heat sink 210.

The heat sink 210 serves to radiate heat generated by the light source 100 to the outside. At this time, the base assembly 200 may be a metal core printed circuit board (MCPCB) including the heat sink 210 and the substrate 220.

The substrate 220 may selectively use a single layer PCB, a multilayer PCB, a ceramic substrate, an MCPCB, or the like. Here, an entire portion of the substrate 220 may be made of the same material, or a part of the entire portion of the base assembly 200 may be made of different materials in some cases.

For example, the substrate 220 may include a supporting part which is in contact with the light source 300 and a connecting part which is not in contact with the light source 300 and, for example, the supporting part and the connecting part of the substrate 220 may be made of the same material. Here, the supporting part and the connecting part may include circuit patterns, and a material of the substrate 220 may be a film having flexibility and insulation such as polyimide or epoxy (for example, FR-4).

In some cases, the supporting part and the connecting part of the substrate 220 may also be made of different materials. For example, the supporting part may be a conductor, but the connecting part may be a nonconductor. In addition, the supporting part of the substrate 220 may be made of a hard material which does not bend to support the light source 100, but the connecting part of the substrate 220 may be made of a flexible material, and thus the base assembly 200 may also be manufactured to be applied to a curved mounting object.

In some cases, a circuit pattern for electrically connecting to the light source 100 is disposed on the circuit substrate 220, and a flexible and hard film may be disposed on one of upper and lower portions of the circuit pattern. For example, the film may be one material selected from a photo solder resist (PSR), a polyimide, an epoxy (for example, FR-4), and the like or a combination thereof.

In addition, when films are disposed on the upper and lower portions of the circuit pattern, the film disposed on the upper portion of the circuit pattern and the film disposed on the lower portion of the circuit pattern may be different. As described above, the substrate 220 may be bent by a flexible material being applied thereto, but may also be bent by changing a structure thereof.

The light source 300 may be a top view type LED and may also be a side view type LED in some cases. Here, the light source 100 may be an LED chip, and the LED chip may include a red LED chip, a blue LED chip, or an ultraviolet LED chip, or may include a package type including a combination of at least one or more of a red LED chip, a green LED chip, a blue LED chip, a yellow-green LED chip, and a white LED.

In addition, the white LED may be realized by a blue LED coated with a yellow phosphor, by a blue LED simultaneously coated with a red phosphor and a green phosphor, or by a blue LED simultaneously coated with a yellow phosphor, a red phosphor, and a green phosphor.

For example, when the lamp unit is applied as a rear light of a vehicle, the light source 100 may be a vertical-type light emitting chip, for example, a red light emitting chip, but the embodiment is not limited thereto.

The lens 400 may cover the light source 300 and may be coupled to the base assembly 200. At this time, the lens 400 may include first protrusions 410 and second protrusions 420.

The first protrusion 410 may be formed to protrude from an edge of a lower surface 430 of the lens 400 toward the base assembly 200. Two first protrusions 410 may be symmetrically disposed with respect to the center of the lens 400. Such a first protrusion 410 may include a first contact surface 411 and a second contact surface 412.

The first contact surface 411 is in contact with an upper surface of the base assembly 200 and serves to prevent the first protrusion 410 from being moved on the substrate 220. Specifically, as illustrated in FIG. 5, the first contact surface 411 may be formed as a stepped surface formed at a center portion of the first protrusion 410 and may be in contact with an upper surface of the heat sink 210 to face the base assembly 200. Accordingly, downward movement of the lens 400 due to an external force applied from an upper side of the lens 400 is prevented.

The second contact surface 412 is in contact with a lower surface of the base assembly 200 and serves to prevent the first protrusion 410 from falling off of the substrate 220. Specifically, as illustrated in FIG. 5, the second contact surface 412 may be formed with a hooking surface of a hook formed on an end of the first protrusion 410. That is, the second contact surface 412 may be formed to protrude from the end of the first protrusion 410 in a radial direction of the lens 400. Such a second contact surface 412 may be in contact with a lower surface of the heat sink 210 to face the base assembly 200.

Accordingly, the second contact surface 412 prevents the lens 400 from falling off of the substrate 220 due to an external force which pulls the lens 400 from above, or an external force or vibrations which push the lens 400 from below.

As described above, since the first protrusion 410 simultaneously grasps the upper and lower surfaces of the base assembly 200 using the first contact surface 411 and the second contact surface 412, a coupling property between the lens 400 and the base assembly 200 is improved.

Meanwhile, as illustrated in FIG. 5, first holes 221 through which the first protrusions 410 pass may be formed in the substrate 220, and second holes 330 aligned with the first holes 221 may be formed in the heat sink 210 so that the first protrusions 410 pass therethrough.

The second protrusion 420 may protrude toward the base assembly 200 from an edge of the lower surface 430 of the lens 400. The second protrusion 420 is disposed to be spaced a predetermined distance from the first protrusion 410, and two second protrusions 420 may be symmetrically disposed with respect to the center of the lens 400. Such a second protrusion 420 may include a third contact surface 421.

The third contact surface 421 is in contact with the upper surface of the base assembly 200 and serves to prevent shaking of the lens 400 on the substrate 220. Specifically, as illustrated in FIG. 6, the third contact surface 421 may be formed as a lower end surface of the second protrusion 420, pass through the first hole 221 to face the base assembly 200, and be in contact with the upper surface of the heat sink 210. Accordingly, the third contact surface 421 serves to prevent the lens 400 from being shaken or moved due to vibrations in a state in which the lens 400 is primarily fixed by the first protrusion 410.

Meanwhile, the lower surface 430 of the lens 400 may be disposed to be spaced apart from the upper surface of the base assembly 200 in a height direction thereof. In addition, the lower surface 430 of the lens 400 may be a flat surface, and an upper surface of the lens 400 may be a curved surface. In addition, the lower surface 430 of the lens may be formed to include a groove corresponding to a center portion of a light emitting surface of the light source 300.

The lamp unit and the vehicle lamp device using the lamp unit according to one exemplary embodiment of the present invention have been specifically described above with respect the accompanying drawings.

While the present invention has been particularly described with reference to exemplary embodiments, those skilled in the art should understand that various changes in form and details may be made without departing from the spirit and scope of the present invention. Therefore, the exemplary embodiments should be considered in a descriptive sense only and not for purposes of limitation. The scope of the present invention is defined not by the detailed description of the present invention but by the appended claims, and encompasses all modifications and equivalents that fall within the scope of the appended claims.

| Reference Numerals | |
| --- | --- |
| 100: OPTICAL MEMBER | 200: BASE ASSEMBLY |
| 210: HEAT SINK | 220: SUBSTRATE |
| 300: LIGHT SOURCE | 400: LENS |
| 410: FIRST PROTRUSION | 411: FIRST CONTACT SURFACE |
| 412: SECOND CONTACT SURFACE | 420: SECOND PROTRUSION |
| 421: THIRD CONTACT SURFACE | |

The invention claimed is:

1. A lamp unit comprising:
an optical member;
a base assembly disposed to be spaced at a predetermined distance from the optical member;
a light source disposed on the base assembly; and
a lens coupled to the base assembly to cover the light source,
wherein the base assembly includes a heat sink and a substrate stacked on the heat sink,
wherein the lens includes a first protrusion and a second protrusion both protruding from an edge of a lower surface of the lens toward the base assembly,
wherein the first protrusion includes a first contact surface to be in contact with an upper surface of the heat sink and a second contact surface to be in contact with a lower surface of the heat sink,
wherein the second protrusion is disposed to be spaced apart from the first protrusion and includes a third contact surface,
wherein the substrate includes a first hole,
wherein the third contact surface passes through the first hole to be in contact with the upper surface of the heat sink,
wherein the first contact surface is formed having a stepped surface and is disposed at the first protrusion and the second contact surface is formed having a surface of a shape of a hook and is disposed at an end of the first protrusion,
wherein a second hole is disposed in the heat sink and aligned with the first hole so that the first protrusion passes therethrough,
wherein at least two protrusions having a same shape as that of the second protrusion are symmetrically disposed with respect to a center of the lens, and
wherein an inner wall of the first hole is in contact with the second protrusion.

2. The lamp unit of claim 1, wherein the first contact surface and the second contact surface face the base assembly.

3. The lamp unit of claim 2, wherein the second contact surface protrudes from the end of the first protrusion in a radial direction of the lens.

4. The lamp unit of claim 1, wherein the third contact surface is formed as a lower end surface of the second protrusion.

5. The lamp unit of claim 1, wherein an outermost side of the first protrusion is continuous with an edge of a lower surface of the lens.

6. The lamp unit of claim 5, wherein an outermost side of the second protrusion is formed with an edge of the lower surface of the lens.

7. The lamp unit of claim 1, wherein at least two protrusions having a same shape as that of the first protrusion are symmetrically disposed with respect to the center of the lens.

8. The lamp unit of claim 1, wherein a lower surface of the lens is disposed to be spaced apart from an upper surface of the base assembly in a height direction thereof.

9. The lamp unit of claim 1, wherein:
a lower surface of the lens is a flat surface; and
an upper surface of the lens is a curved surface.

10. The lamp unit of claim 9, wherein the upper surface of the lens includes a groove corresponding to a center portion of a light emitting surface of the light source.

11. A vehicle lamp device comprising the lamp unit of claim 1.

12. A vehicle lamp device comprising the lamp unit of claim 2.

13. A vehicle lamp device comprising the lamp unit of claim 3.

14. A vehicle lamp device comprising the lamp unit of claim 4.

15. A vehicle lamp device comprising the lamp unit of claim 5.

16. A vehicle lamp device comprising the lamp unit of claim 6.

17. A vehicle lamp device comprising the lamp unit of claim 7.

18. A vehicle lamp device comprising the lamp unit of claim 8.

19. A vehicle lamp device comprising the lamp unit of claim 9.

20. A vehicle lamp device comprising the lamp unit of claim 10.

* * * * *